April 21, 1953 J. J. SIGMAN Re. 23,649

INSULATING SPLICE PROTECTOR

Original Filed Feb. 16, 1948

INVENTOR.

BY John J. Sigman

McCanna & Morsbach

Attys.

Reissued Apr. 21, 1953

Re. 23,649

UNITED STATES PATENT OFFICE 23,649

INSULATING SPLICE PROTECTOR

John J. Sigman, Cicero, Ill.

Original No. 2,571,771, dated October 16, 1951, Serial No. 8,560, February 16, 1948. Application for reissue October 14, 1952, Serial No. 314,761

5 Claims. (Cl. 174—138)

Matter enclosed in heavy brackets [ ] appears in the original patent but forms no part of this reissue specification; matter printed in italics indicates the additions made by reissue.

This invention relates to insulating and protecting the joints of spliced electrical conductors and has more particular reference to covers for tail joints and the like.

In this type of joint or splice the exposed wire ends are twisted together and soldered and the more common practice is to wrap tape about the splice to provide an insulating cover. Also it has been known to provide caps or covers of rubber or other insulating material for application to the twisted or spliced ends of the conductor wires. And, although such insulations when properly applied may meet the requirements of insurance underwriters, nevertheless it is found that they are not always effective over long periods and particularly when subject to adverse weather and moisture conditions and also vibration conditions.

The principal object of my invention is, therefore, to provide an improved insulating splice protector which will effectively and satisfactorily maintain the desired insulation protection.

Another object is to provide an insulating splice protector of this kind especially adapted for its safety qualities, that is, its ability to maintain the desired insulation regardless of interfering influences such as moisture and weather conditions under which the expansion and contraction of the cover or sheath components in time cause loosening and displacement, particularly where tape and other bands or strips are wound or tied to secure the insulation. This safety feature of my invention is also intended to eliminate loosening of a cover subject to vibration conditions such as occurs in machines, buildings, and the like.

Another object is to provide an insulating splice protector which when applied is effectively locked against displacement and cannot be removed or impaired except by deliberate manual application.

Another object is to provide an insulating splice protector of the kind described which is constructed in such simple and novel manner as to permit quick and easy application and also to permit manufacture at a comparatively low cost.

Other objects and attendant advantages will be appreciated by those skilled in this art as the invention becomes better understood by reference to the following description when considered in connection with the accompanying drawings, in which—

Figure 1:
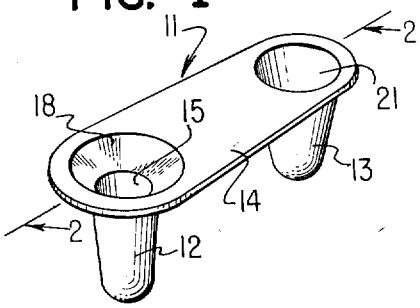
Figure 1 is a perspective view of one embodiment of an insulating splice protector, embodying my invention.
Figure 2:
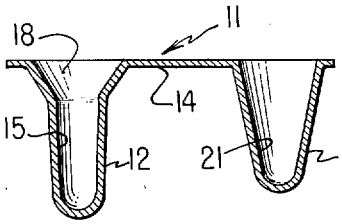
Figure 2 is a section through the protector taken substantially on the section line 2—2 of Figure 1.
Figure 3:
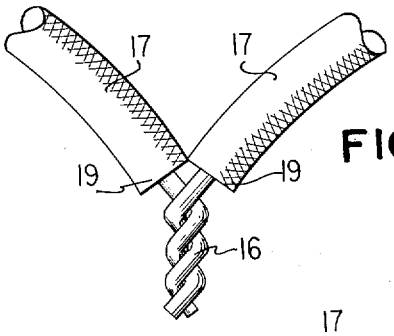
Figure 3 shows a conventional tail joint or splice of a kind to which my invention is applied.

The embodiment shown in the drawings is illustrative of the principle and advantages of my invention, but it should be understood that the invention may be applied in other embodiments and modifications. As here portrayed my invention contemplates a one-piece molded body of insulation material designated generally by 11, preferably of rubber or suitable synthetic materials. This body is shaped to provide a cover portion 12 for receiving and covering the tail joint of spliced conductors or of other spliced members, a retaining portion 13 shaped to engage the cover portion and to further protect the splice, and a connecting portion 14 between the portions 12 and 13 preferably elastic or resilient and arranged to yieldingly retain the portion 13 engaged with the portion 12. In this embodiment each portion 12 and 13 is in the nature of a socket or pocket member, open at one end and closed at the opposite. The portion 12 has an elongated passage 15 of comparatively small diameter to provide a tight fit to the tail joint 16 of the spliced conductor wires 17. The passage 15 preferably merges into an outwardly tapered opening 18 designed to receive and protect the adjacent sheath ends 19 of the conductors. The portion 13 preferably has a tapered socket 21 adapted to fit over the exterior closed end of the portion 12 when applied in the manner presently to be described. The portion 14 serves as a connector between the socket portions to retain them in cooperative relation, also as a protector band in the crotch between the conductors and as a further sheath to the open end of the cover portion 12, and further as a yieldable means to retain the socket portion 13 in the holding or locked position.

Figure 4:
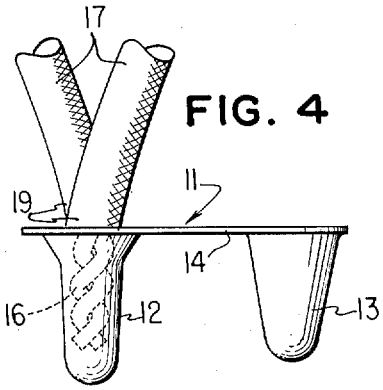
Figure 4 is a side view showing the first step in applying the protector to the tail joint.
Figure 5:
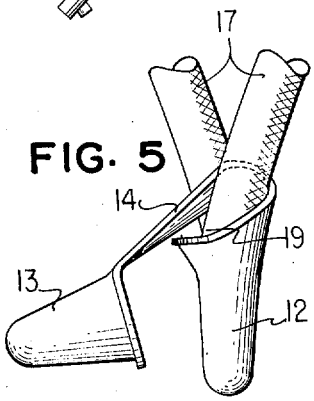
Figures 5 and 6 are side views showing further steps in applying the protector.
Figure 6:
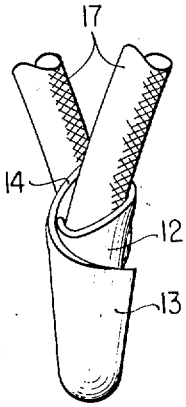
Figure 7:
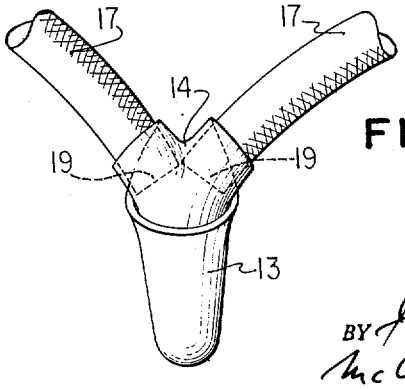
Figure 7 is a view from the front, that is, looking from the left of Figure 6, showing the protector fully applied.

The first step in applying the protector is to insert the tail joint fully into the socket passage 15, as shown in Figure 4. The free socket portion 13 is then passed through the crotch of the conductors 17 and the portion 14 is drawn tightly down into the crotch to effectively seal and protect this area as in Figures 5–6. When sufficiently pulled down and reversed again to its upright direction the socket 21 is inserted over the closed end of the socket portion 12 until fully seated thereon, as shown in Figure 1. In this condition the socket portion 13 is retained by its frictional engagement on the portion 12 and also by the elastic pull of the connecting portion 14. The portion 13 also provides a further protecting sheath and cover, reinforcing the cover provided by the portion 12.

This construction provides a most effective insulating cover for the spliced portion and the several component portions of the cover are so securely applied, locked, and retained, as to be proof against loosening or displacement by vibration, accident, abrasion, or the most adverse weather conditions. In addition to these features, the several portions of the cover provide a most effective seal and protection to the spliced connection between the conductors. These several portions of the cover are retained and locked in position not only by the socket fitting of one to the other but by the pull exerted in a direction to hold the portion 13 seated over the projecting end of the portion 12. Thus, in order to remove the cover the portion 13 must be forcibly pulled down against the tension of the connecting portion 14, until entirely clear of the portion 12. The portions 13 and 14 may now be passed back through the crotch of the conductors to a position corresponding with Figure 4, wherein the socket portion 12 is free to be removed.

It will be apparent to those skilled in this art that modifications may be made in the shape, size, and materials, in adapting my invention to different splices and to different manufacturing conditions. For example, the cover would be made in different sizes to suit different ranges of conductor sizes and splice sizes. Also, the principle herein disclosed may be embodied in different shapes to suit different conductor conditions. Also, in the manufacture of this protector the structure may be fabricated from plural parts or materials, or provided with reinforcements to take care of heavy duty insulation requirements.

From the foregoing it will be apparent that changes may be made in details of construction without departing from the spirit and scope of the invention as expressed in the appended claims, in which—

I claim:

1. An insulating protector for the spliced ends of conductors, comprising an insulating cover member provided with a pocket for receiving and covering the spliced ends of the conductors, a deformable member connected to said insulating cover member and adapted to be stretched around the crotch between the conductors, thereby to hold said insulating cover member in place on the spliced ends of the conductors, a second cover member connected to said deformable member at a point spaced from said first-named cover member and provided with a pocket for receiving and covering said first-named cover member to hold said deformable member stretched around the crotch between the conductors.

2. An insulating protector for the spliced ends of conductors, comprising an insulating cover member provided with a pocket for receiving and covering the spliced ends of the conductors, said insulating cover member being provided with an elongated relatively narrow pocket passage which terminates at its entrance end in a flared opening, a deformable member connected at one end to said insulating cover member and normally extending away from said insulating cover member substantially at right angles to the longitudinal axis of said pocket passage, said deformable member being adapted to be stretched around the crotch between the conductors to hold said insulating cover member in place on the spliced ends of the conductors, and a second cover member connected to the other end of said deformable member and provided with a tapered pocket for receiving and covering said first-named cover member to hold said deformable member stretched around the crotch between the conductors.

3. A one-piece insulating protector for the spliced ends of conductors, said protector being formed of thin walled molded elastic insulating material and comprising a cover member provided with a pocket for receiving and covering the spliced ends of the conductors, a connecting member connected to said cover member and adapted to be stretched around the crotch between the conductors to hold said cover member in place on the spliced ends of the conductors, and a second cover member connected to said connecting member at a point spaced from said first-named cover member and provided with a pocket for receiving and covering said first-named cover member to hold said connecting member stretched around the crotch between the conductors.

4. A one-piece insulating protector for the spliced ends of conductors, said protector being formed throughout of thin walled molded elastic insulating material to have elasticity in all of its parts and comprising a cover member provided with a pocket for receiving and covering the spliced ends of the conductors, said cover member being provided with an elongated relatively narrow pocket passage which terminates at its entrance end in a flared opening, a connecting member connected at one end to said cover member and normally extending away from said cover member substantially at right angles to the longitudinal axis of said pocket passage, said connecting member being adapted to be stretched around the crotch between the conductors to hold said cover member in place on the spliced ends of the conductors, and a second cover member connected to the other end of said connecting member and provided with a tapered pocket for receiving and covering said first-named cover member to hold said connecting member stretched around the crotch between the conductors.

*5. An insulating protector for the spliced ends of two or more insulated conductors disposed to define a crotch between the conductors, comprising an insulating cover member provided with a pocket for receiving and substantially completely covering the spliced ends of the conductors, a stretchable deformable member connected to said insulating cover member and adapted to be stretched around the crotch between the conductors, thereby to hold said insulating cover member in place on the spliced ends of the conductors, and means defining a*

*preformed retaining member having a tubular wall portion connected to said deformable member and normally extending substantially normal to said deformable member at a point spaced from said cover member and provided with an opening for receiving said cover member to hold said deformable member stretched around said crotch between said conductors.*

JOHN J. SIGMAN.

References Cited in the file of this patent or the original patent

UNITED STATES PATENTS

| Number | Name | Date |
|---|---|---|
| 1,176,288 | Hamilton | Mar. 21, 1916 |
| 1,354,905 | Hamilton | Oct. 5, 1920 |
| 2,182,492 | Hall | Dec. 5, 1939 |
| 2,308,286 | Joyce | Jan. 12, 1943 |

FOREIGN PATENTS

| Number | Country | Date |
|---|---|---|
| 201,703 | Great Britain | Aug. 9, 1923 |
| 470,233 | Great Britain | Aug. 11, 1937 |